US010681778B2

United States Patent
Nosrati et al.

(10) Patent No.: US 10,681,778 B2
(45) Date of Patent: Jun. 9, 2020

(54) INTEGRATED HEATER AND METHOD OF MANUFACTURE

(71) Applicant: Watlow Electric Manufacturing Company, St. Louis, MO (US)

(72) Inventors: Mohammad Nosrati, Redwood City, CA (US); Kurt English, Columbia, MO (US); Patrick Margavio, Columbia, MO (US); Kevin Smith, Columbia, MO (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 309 days.

(21) Appl. No.: 15/819,028

(22) Filed: Nov. 21, 2017

(65) Prior Publication Data

US 2019/0159293 A1   May 23, 2019

(51) Int. Cl.
| | |
|---|---|
| *H05B 3/18* | (2006.01) |
| *H05B 3/03* | (2006.01) |
| *H05B 3/28* | (2006.01) |
| *H05B 3/26* | (2006.01) |
| *H01Q 1/02* | (2006.01) |
| *H02N 13/00* | (2006.01) |

(52) U.S. Cl.
CPC .............. *H05B 3/18* (2013.01); *H05B 3/03* (2013.01); *H05B 3/265* (2013.01); *H05B 3/283* (2013.01); *H01Q 1/02* (2013.01); *H02N 13/00* (2013.01); *H05B 2203/013* (2013.01); *H05B 2203/016* (2013.01); *H05B 2203/017* (2013.01)

(58) Field of Classification Search
USPC ......................................... 219/541, 520–533
See application file for complete search history.

(56) References Cited

U.S. PATENT DOCUMENTS

| | | |
|---|---|---|
| 5,992,320 A | 11/1999 | Kosaka et al. |
| 6,207,553 B1 | 3/2001 | Buynoski et al. |
| 6,284,619 B1 | 9/2001 | Seymour et al. |
| 6,323,121 B1 | 11/2001 | Liu et al. |
| 6,677,678 B2 | 1/2004 | Biolsi et al. |
| 8,211,791 B2 | 7/2012 | Lin et al. |
| 9,245,792 B2 | 1/2016 | Chen et al. |
| 9,337,124 B1 | 5/2016 | Herrault et al. |
| 2006/0183055 A1 | 8/2006 | O'Neill et al. |
| 2007/0257022 A1 | 11/2007 | Lin et al. |
| 2010/0243635 A1 | 9/2010 | Nakamura et al. |
| 2012/0085747 A1 | 4/2012 | Chao et al. |

(Continued)

FOREIGN PATENT DOCUMENTS

| | | |
|---|---|---|
| EP | 1211912 | 6/2002 |
| JP | H08138845 | 5/1996 |

(Continued)

OTHER PUBLICATIONS

International Search Report for International Application PCT/US2019/033472, dated Sep. 18, 2019.

(Continued)

*Primary Examiner* — Lori L Baker
(74) *Attorney, Agent, or Firm* — Burris Law, PLLC

(57) ABSTRACT

A method of constructing a heater includes providing a substrate, forming at least one trench into the substrate, depositing a functional material onto the substrate and into the at least one trench to form a functional element, and providing an electrical termination in contact with the functional element.

20 Claims, 7 Drawing Sheets

(56) References Cited

U.S. PATENT DOCUMENTS

2014/0144901 A1  5/2014  Cuvalci et al.
2015/0053667 A1  2/2015  Kushihashi et al.
2015/0055940 A1  2/2015  Steinhauser

FOREIGN PATENT DOCUMENTS

TW  201216368  4/2012
WO  2007041428  4/2007

OTHER PUBLICATIONS

International Search Report for International Application PCT/US2018/061754, dated Mar. 1, 2019.

INTEGRATED HEATER AND METHOD OF MANUFACTURE

FIELD

The present disclosure relates generally to electric heaters, and more particularly to electric heaters with a more uniform structure and more uniform heating performance and methods of manufacturing same.

BACKGROUND

The statements in this section merely provide background information related to the present disclosure and may not constitute prior art.

Electric heaters generally include a substrate, a dielectric layer disposed on the substrate, a resistive heating layer disposed on the dielectric layer, and a protective layer disposed on the resistive heating layer. The dielectric layer, the resistive heating layer, and the protective layer may be broadly called "functional layers." One or more of the functional layers of the electric heaters may be in the form of a film by depositing a material onto a surface or a substrate.

On a microscopic scale, a deposited film may have an uneven surface due to existing features or trenches on the substrate surface. A top surface of the deposited film generally undergoes a planarization process in order to flatten the top surface and to provide more uniform performance of the functional layer. However, the planarization process may undesirably remove excessive material from the deposited film, making the thickness of the final deposited film deviate from its designed thickness. Moreover, when the deposited film is a dielectric layer with an electrical element embedded therein, the dielectric integrity of the film may be compromised due to the reduced thickness of the dielectric layer, resulting in poor performance of the electric heater.

SUMMARY

In one form, a method of constructing a heater is provided. The method includes: providing a substrate; forming at least one trench into the substrate; depositing a functional material onto the substrate and into the at least one trench to form a functional element; and providing an electrical termination in contact with the functional element.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

Corresponding reference numerals indicate corresponding parts throughout the several views of the drawings.

DETAILED DESCRIPTION

The following description is merely exemplary in nature and is not intended to limit the present disclosure, application, or uses.

Figure 1:
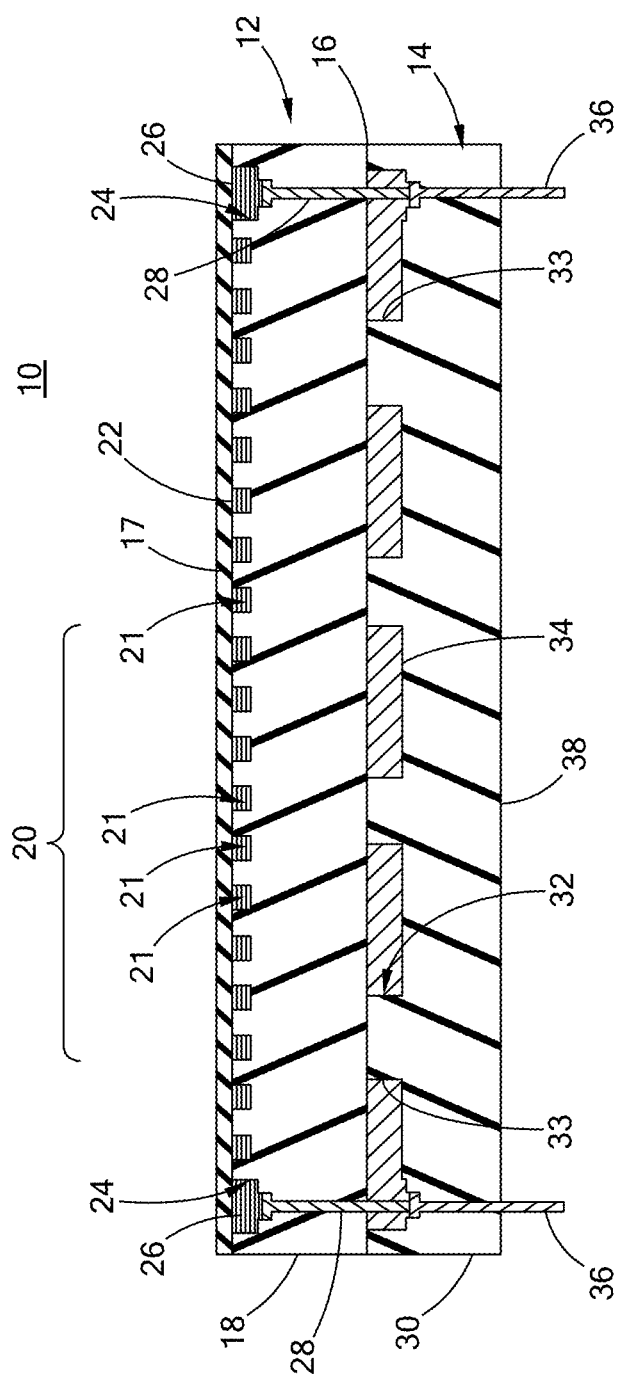
FIG. 1 is a cross-sectional view of an electric heater constructed in accordance with the teachings of the present disclosure.

Referring to FIG. 1, an electric heater 10 constructed in accordance with the teachings of the present disclosure includes a heater layer 12, a routing layer 14, a bonding layer 16 disposed between the heater layer 12 and the routing layer 16, and a protective layer 17 disposed on the heater layer 12. The bonding layer 16 bonds the heater layer 12 to the routing layer 14. The protective layer 17 electrically insulates the heater layer 12.

The heater layer 12 includes a substrate 18 defining at least one trench 20, and at least one resistive heating element 22 disposed in the trench 20. When a plurality of trenches 20 are formed in the substrate 18, a plurality of resistive heating elements 22 may be disposed in the plurality of trenches 20 to define a plurality of heating zones. The trench 20 may define a plurality of first trench sections 21 and at least two second trench sections 24 having an enlarged trench area for electrical termination. The trench 20 defines a depth of about 1 to 10 microns, preferably a depth of about 3 to 5 microns.

The resistive heating element 22 includes at least two terminal pads 26 disposed in the second trench sections 24 having enlarged trench areas. The resistive heating element 22 has a resistive material selected from the group consisting of molybdenum, tungsten, platinum, or alloys thereof. In addition, the resistive material of the resistive heating element 22 may have sufficient temperature coefficient of resistance (TCR) characteristics such that the resistive heating element 22 functions as a heater and as a temperature sensor.

The heater layer 12 further includes a pair of terminal pins 28 in direct contact with the terminal pads 26 of the resistive heating element 22 and extending from the terminal pads 26 through the substrate 18 and the bonding layer 16 to the routing layer 14.

The routing layer 14 includes a substrate 30 defining at least one trench 32, and a routing element 34 disposed in the trench 32. One or more routing elements 34 may be provided depending on applications. The routing element 34 functions to connect the resistive heating elements 22 of the heater layer 12 to an external power source (not shown). The trench 32 of the routing layer 14 may include at least two trench sections 33 corresponding to the second trench sections 24 of the trench 20 of the heater layer 12. The routing layer 14 further includes a pair of terminal pins 36 located in the at least two trench sections 33 and extending from the routing element 34 through the substrate 30 and beyond a lower surface 38 of the substrate 30. The terminal pins 36 of the routing layer 14 are aligned with and in contact with the terminal pins 28 of the heater layer 12.

The substrate 18 of the heater layer 12 and the substrate 30 of the routing layer 14 may include a ceramic material, such as aluminum nitride and aluminum oxide.

Figure 2A:
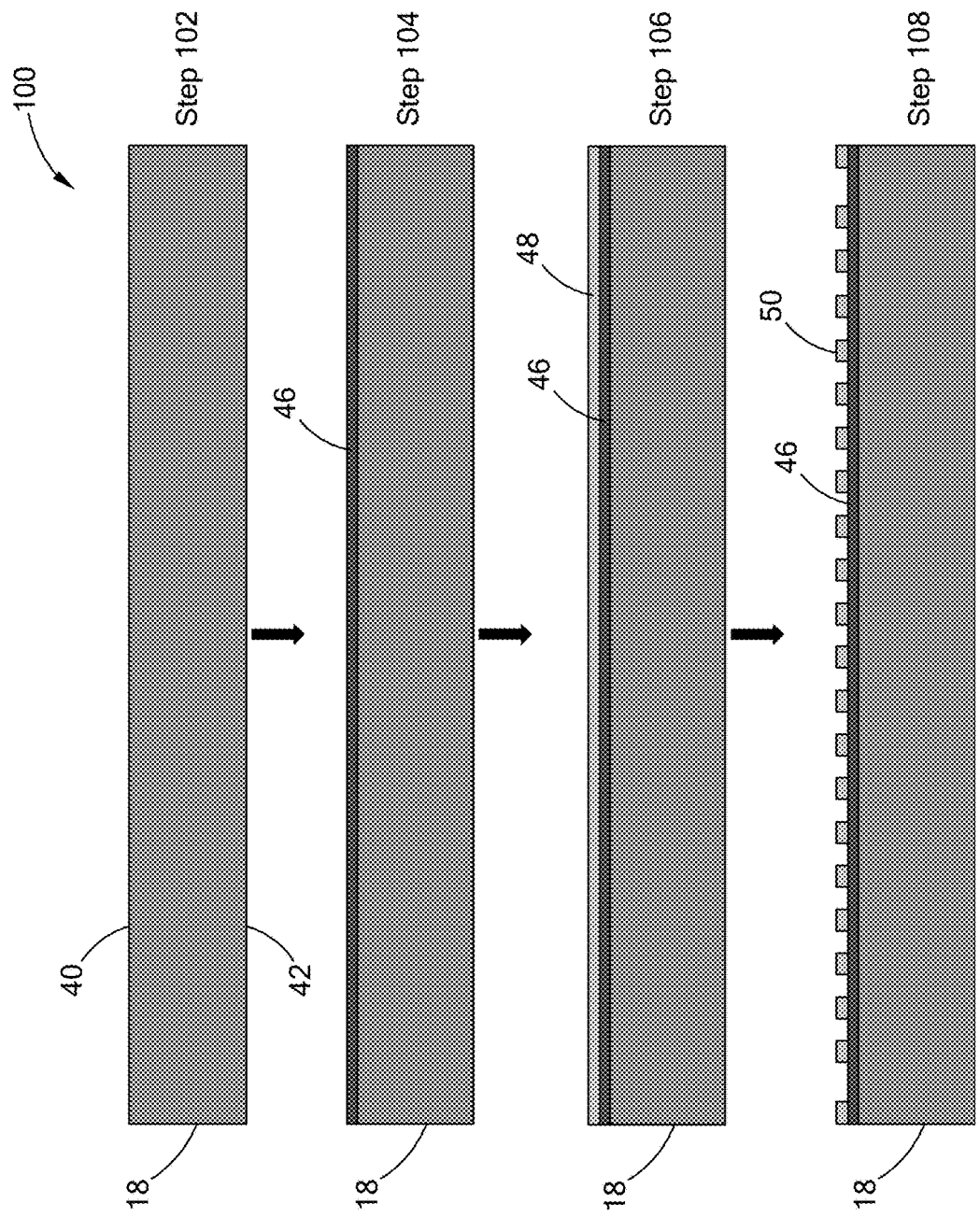
FIG. 2A through 2D are diagrams illustrating steps of manufacturing a heater layer of an electric heater of FIG. 1 in accordance with the teachings of the present disclosure.
Figure 2B:
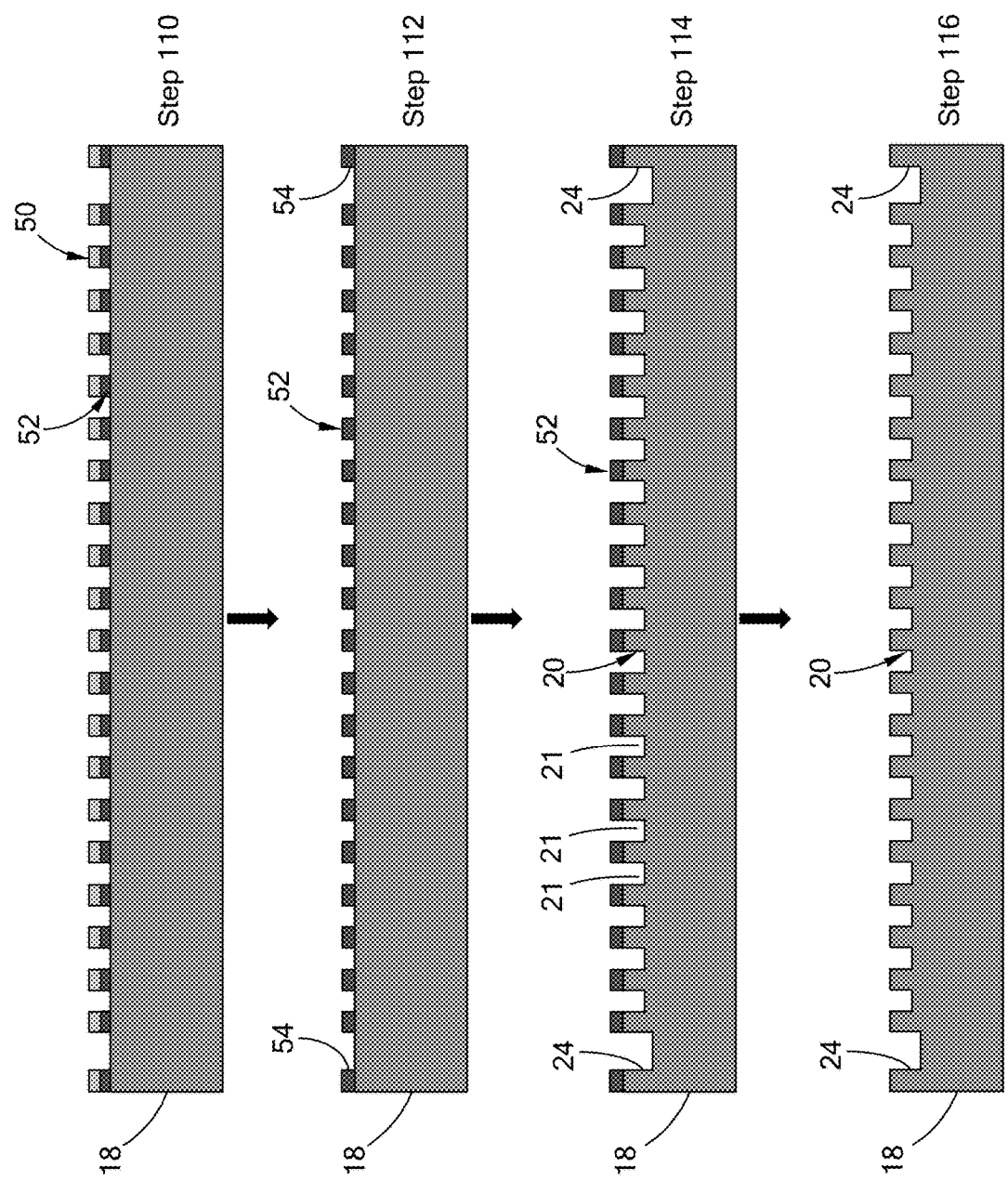
Figure 2C:
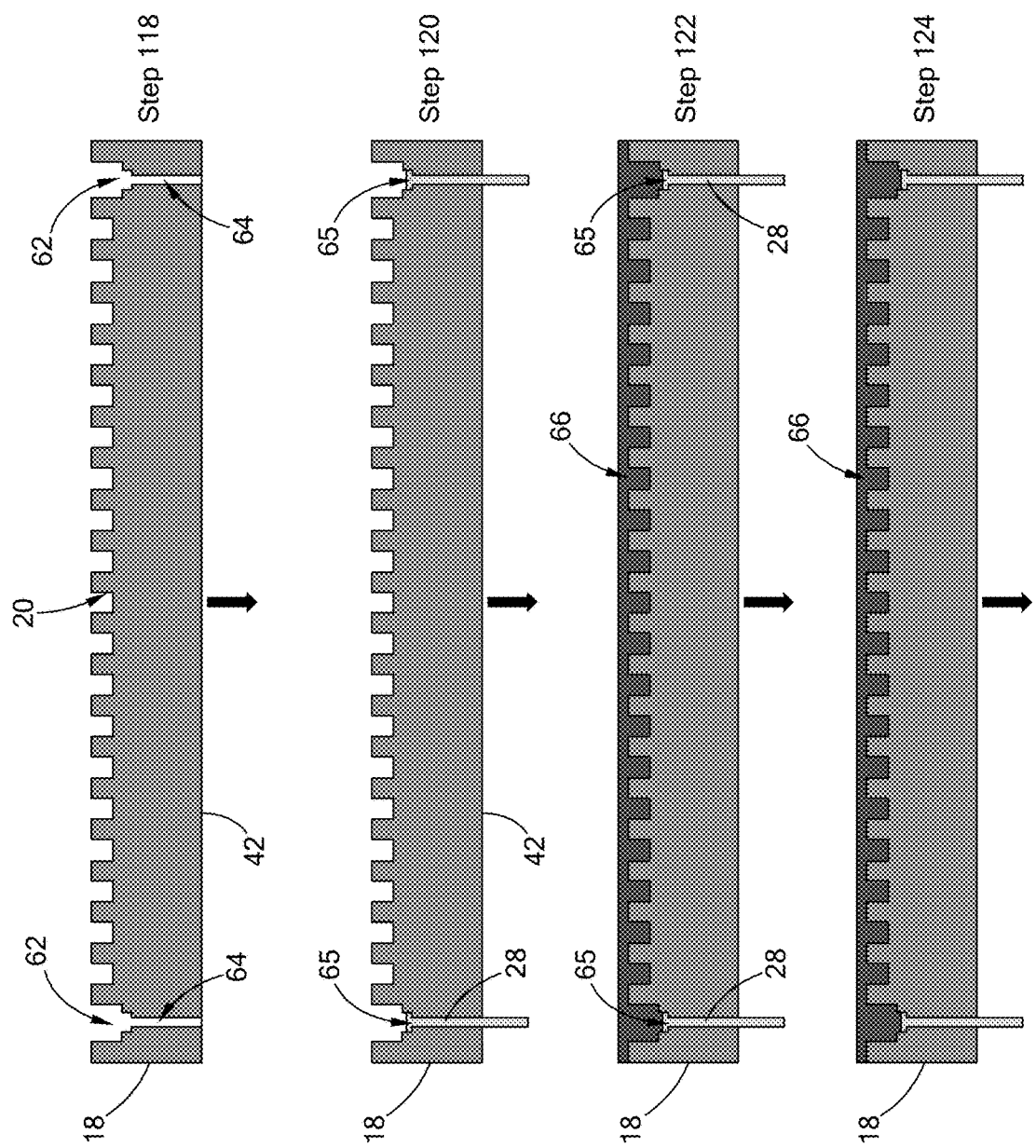
Figure 2D:
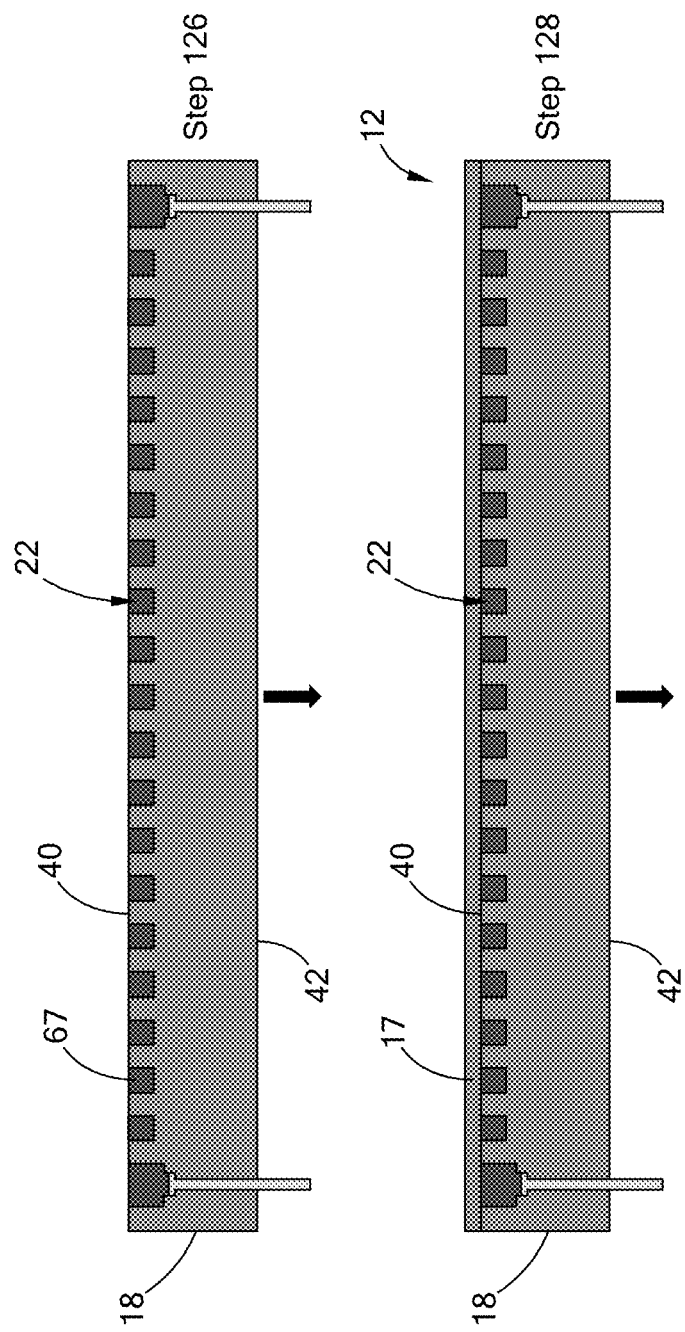
Figure 2E:
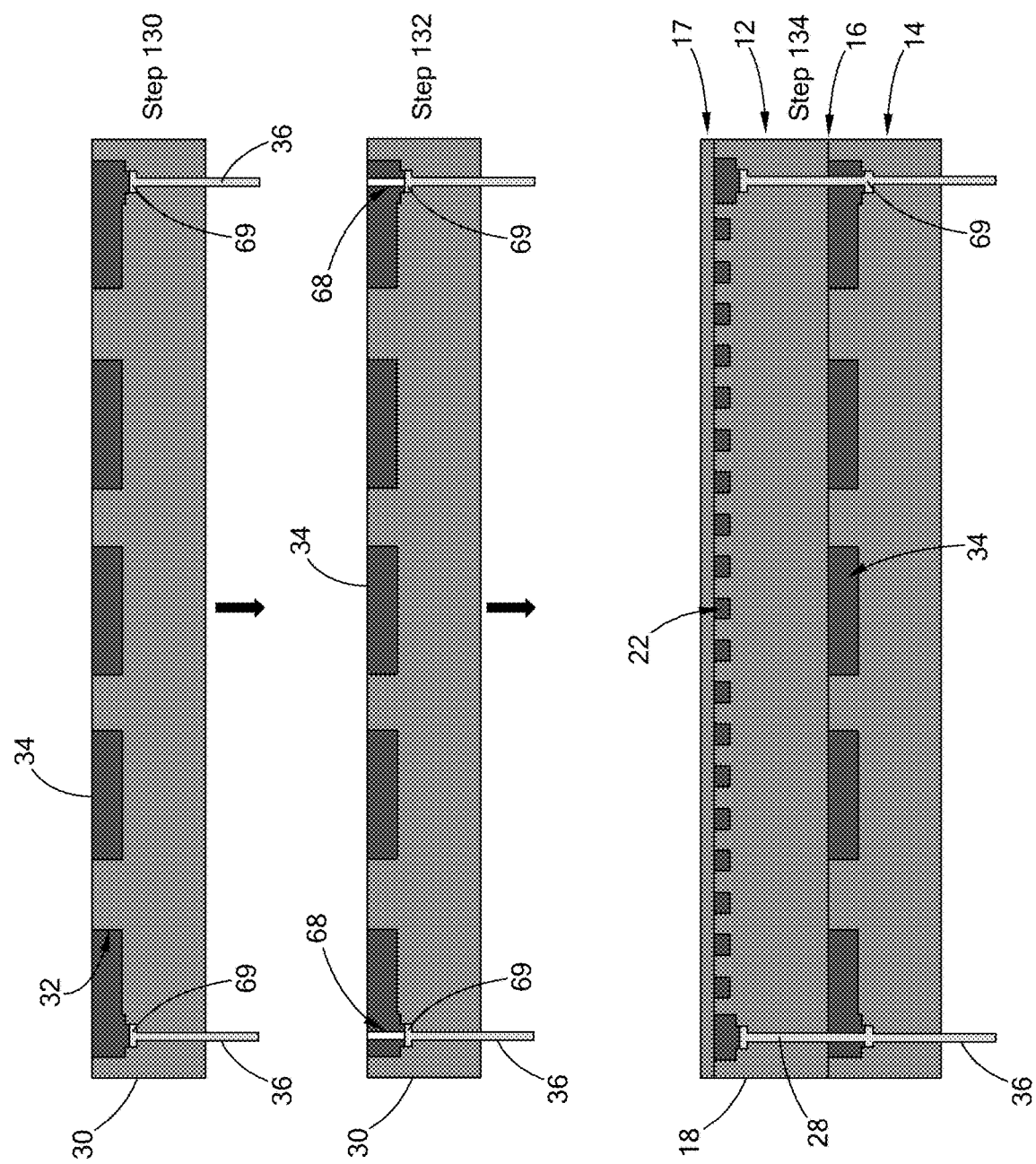
FIG. 2E is a diagram illustrating steps of manufacturing a routing layer of an electric heater of FIG. 1 in accordance with the teachings of the present disclosure.

Referring to FIGS. 2A through 2E, a method 100 of constructing an electric heater 10 of FIG. 1 includes a sub-process of manufacturing the heater layer 12 (as shown FIGS. 2A through 2D) and a sub-process of manufacturing the routing layer 14 (as shown in FIG. 2E), followed by bonding the heater layer 12 and the routing layer 14 together (also shown in FIG. 2E). The two sub-processes may be performed simultaneously or one after the other.

In the sub-process of manufacturing the heater layer 12, a substrate 18 in a blank form is provided in step 102. The substrate 18 has opposing first and second surfaces 40 and 42. A hard mask layer 46 is formed, such as by deposition, on the first surface 40 in step 104.

Next, a photo resist layer 48 is deposited on the hard mask layer 46 in step 106. The photo resist layer 48 is etched to form a photo resist pattern 50 on the hard mask layer 46 in step 108. In this step, a photo mask (not shown) for patterning the photo resist layer 48 is placed above the photo resist layer 48, and an ultraviolet (UV) light is applied onto the photo resist layer 48 through the photo mask to develop the portions of the photo resist layer 48 that are exposed to the UV light, followed by etching the exposed portion or the unexposed portions of the photo resist layer 48 to form the photo resist pattern 50. The photo resist pattern 50 may be a positive pattern or a negative pattern depending on whether the exposed or unexposed portions of the photo resist layer 48 are etched and removed.

Referring to FIG. 2B, the hard mask layer 46 is etched by using the photo resist pattern 50 as a mask to form a hard mask pattern 52 in step 110. Thereafter, the photo resist pattern 50 is removed, leaving the hard mask pattern 52 on the first surface 40 of the substrate 18 in step 112. The hard mask pattern 52 includes at least two enlarged openings 54.

Next, an etching process is performed on the first surface 40 of the substrate 18 by using the hard mask pattern 52 as a mask to form at least one trench 20 in the substrate 18 in step 114. The trench 20 defines a plurality of first trench sections 21 and at least two second trench sections 24 having enlarged areas. The at least two second trench sections 24 correspond to the at least two enlarged openings 54 of the hard mask pattern 52. The at least one trench 20 may be formed by a laser removal process, machining, 3D sintering/printing/additive manufacturing, green state, molding, waterjet, hybrid laser/water, dry plasma etching.

After the trench 20 is formed in the substrate 18, the hard mask pattern 52 is removed and the substrate 18 is cleaned to form a substrate 18 with a trench 20 with a desired trench pattern on the first surface 40 of the substrate 18 in step 114.

The number of the trenches 20 and the number of the enlarged second trench sections 24 depend on the number of heating zones of the resistive heating element 22 to be formed in the trench 20. The depth and width of the first and second trench sections 21 and 24 of the trench 20 depend on the desired function and performance of the resistive heating element 22. For example, when only one trench 20 is formed in the substrate 18, the trench 20 may have a constant or varied depth and/or width. When a plurality of trenches 20 are formed in the substrate 18, some of the trenches 20 may be wider and the others may be narrower; some of the trenches 20 may be deeper and the others may be shallower.

Referring to FIG. 2C, after the trench 20 with a desired trench pattern is formed in the substrate 18, a machining process is performed in each of the enlarged second trench sections 24 of the trench 20 to form a pad opening 62 and a via hole 64 through the substrate 18 in step 118. The pad opening 62 is disposed between the via hole 64 and the enlarged second trench section 24. The via hole 64 extends from the pad opening 62 to the second surface 42 of the substrate 18.

At step 120, a pair of terminal pins 28 are inserted into the via holes 64 and extend through the substrate from the pad opening 62 past the second surface 42 of the substrate 18.

Each terminal pin 28 includes a terminal end 26 disposed in the pad opening 62 between the via hole 64 and the enlarged second trench section 24.

Thereafter, a resistive material 66 is deposited on the first surface 40 of the substrate 18 and in the trench 20 in step 122. As an example, the resistive material 66 may be formed on the substrate 18 and in the trench 20.

The resistive material 66 is thermally treated in step 124. As an example, the substrate 18 with the resistive material 66 disposed both in the trench 20 and on the first surface 40 of the substrate 18 may be placed in a furnace for annealing.

Referring to FIG. 2D, after the resistive material 66 is thermally treated, a chemical mechanical polishing/planarization (CMP) process is performed on the resistive material 66 to remove excess resistive material 66 until the first surface 40 of the substrate 18 is exposed, thereby forming a resistive heating element 22 in the trench 20 in step 126. In this step, the first surface 40 of the substrate 18 is exposed and not covered by any resistive material 66. The resistive material 66 remaining in the trench 20 forms the resistive heating element 22 having a top surface 67 flush with the first surface 40 of the substrate 18.

Finally, a protective layer 17 is formed on the first surface 40 of the substrate 18 and the top surface 67 of the resistive heating element 22 in step 128. The protective layer 17 electrically insulates the resistive heating element 22. The protective layer 17 may be formed on the substrate 18 by bonding a preformed protective layer to the substrate 18. The bonding process may be a brazing process or a glass frit bonding. Alternatively, when multiple trenches 20 are formed in the substrate 18, some of the trenches 20, preferably the trenches located around periphery of the substrate 18, may be filled with a bonding agent so that the bonding agent in some of the trenches 20 may bond the substrate 18 to the protective layer 17. After the protective layer 17 is formed on the substrate 18, a heater layer 12 is completed.

As previously described, the depth and width of the trench 20 may be configured to be varied along the length of the trench 20. With varied depth and width, the trench 20 allows the resistive heating element 22 to be formed with varied thickness and width along its length, thereby achieving variable wattage along the length of the resistive heating element 22. Moreover, by using the trench 20 to define the shape of the resistive heating element 22, it is possible to deposit different materials in different portions of the same trench, or to deposit two or more layers of materials in the same trench 20. For example, a resistive material may be deposited in the trench 20 first, followed by depositing a bonding agent on top of the resistive material. Therefore, the materials in the trench 20 can also be used as a bonding agent to bond a protective layer thereon. Engineered layers or doped materials may also be deposited in different portions of the trench 20 to achieve a resistive heating element having different material properties along its length.

Referring to FIG. 2E, the sub-process of manufacturing a routing layer 14 includes steps similar to the steps of the sub-process of manufacturing a heater layer 12 previously described except that the sub-process of manufacturing a routing layer 14 includes a step of machining a via hole through the routing material and does not include a step of bonding a protective layer. Moreover, since the heater layer 12 and the routing layer 14 have different function, the materials for forming the resistive heating element 22 and the routing element 34 are different.

More specifically, the sub-process of manufacturing the routing layer 14 includes steps similar to step 102 through step 126 as previously described in connection with FIG. 2A to FIG. 2D. Therefore, the detailed description of these steps are omitted herein for clarity. The material filling in the trench 32 of the routing layer 14 is different from the material filling in the trench 20 of the heater layer 12. The heater layer 12 is configured to generate heat and thus, the material that fills in the trench 20 of the substrate 18 is a resistive material having relatively high resistivity in order to generate heat. In the routing layer 14, the material that fills in the trench 32 of the substrate 30 is a conductive material having relatively high conductivity in order to electrically connect the resistive heating element 22 of the heater layer 12 to an external power source.

Moreover, the substrate 30 of the routing layer 14 has a trench 32 having a trench pattern different from that of the trench 20 of the substrate 18 of the heater layer 12. As shown in FIG. 2E, the trench 32 of the routing layer 14 is shown to be wider than the trench 20 of the heater layer 12.

Referring to FIG. 2E, the routing material is thermally treated and planarized to form a routing element 34 in step 130. In this step, the top surface of the substrate 30 is flush with the top surface of the routing element 34. Similar to the heater layer 12, the routing layer 14 includes a pair of terminal pins 36 and a pair of terminal ends 69 connected to at least two portions of the routing element 34.

Next, the routing element 34 is machined to define a pair of via holes 68 extending from a top surface of the routing element 34 to the terminal ends 69 in step 132. Thereafter, the heater layer 12 is placed on top of the routing layer 14 in step 134. The terminal pins 28 of the heater layer 12 that extend beyond the second surface 42 of the substrate 18 are inserted into the via holes 68 so that the terminal pins 28 of the heater layer 12 are in contact with the terminal end 69 of the routing layer 14. Therefore, the resistive heating element 22 of the heater layer 12 is electrically connected to the routing element 34, which in turn, is electrically connected to an external power source.

Figure 3:
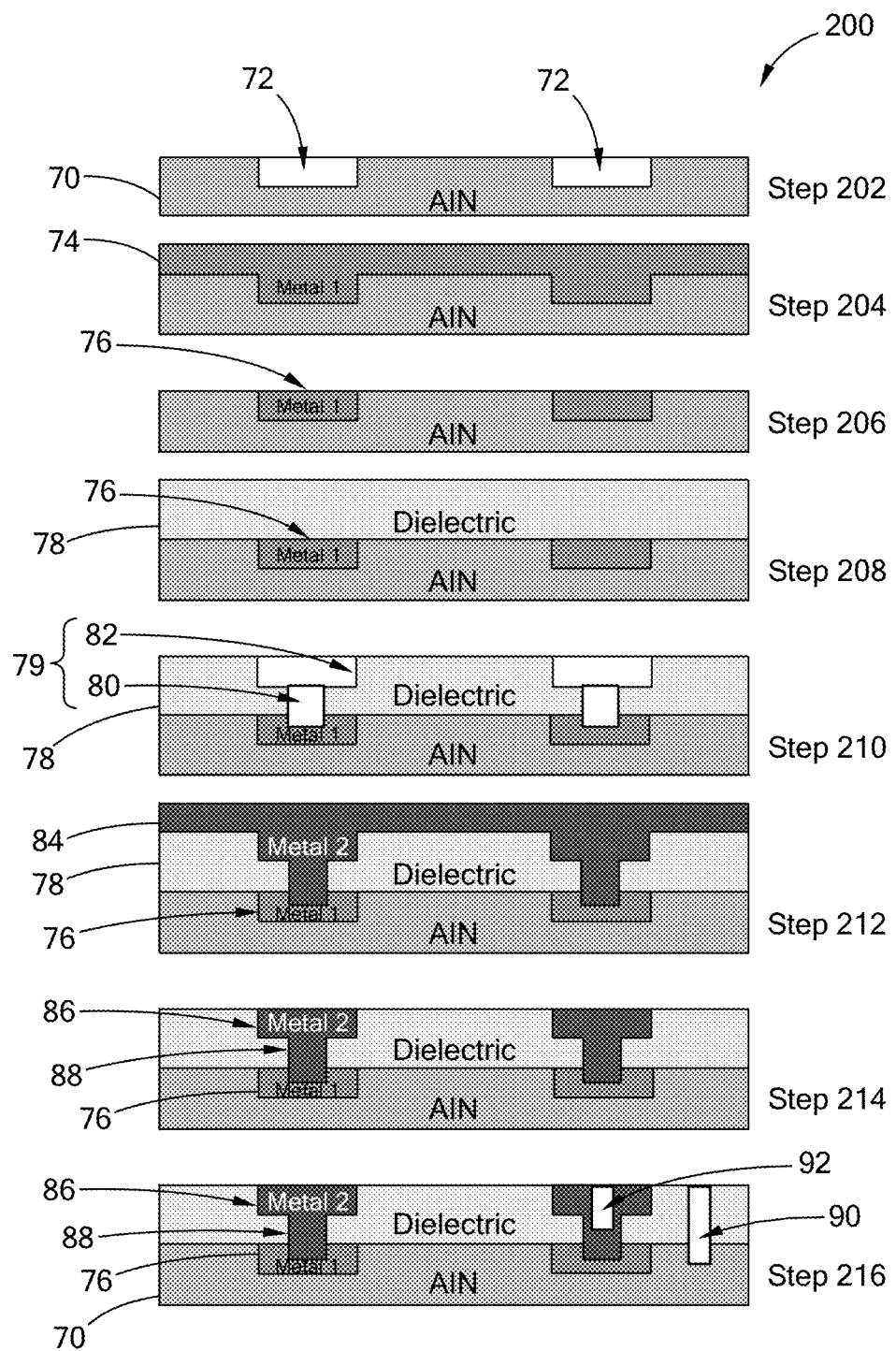
FIG. 3 is a diagram illustrating steps of a variant of a method of manufacturing an electric heater in accordance with the teachings of the present disclosure.

Referring to FIG. 3, a variant of a method 200 of manufacturing an electric heater in accordance with the teachings of the present disclosure is described. The method can be applied to form another electrical component, such as, an electrode layer of an electrostatic chuck, and an RF antenna layer, depending on the type of functional material that fills in the trench of the substrate.

The method 200 starts with providing a substrate 70, and forming at least one trench 72 into the substrate 70 in step 202. The substrate 70 may include aluminum nitride. In this step, the at least one trench may be formed by a mechanical method, such as a laser removal/cutting process, micro bead blasting, machining, 3D sintering/printing/additive manufacturing, green state, molding, waterjet, hybrid laser/water, or dry plasma etching without using a hard mask pattern. When a micro bead blasting process is used, the particle size of the beads is less than 100 μm, preferably less than 50 μm.

Next, a first functional material 74, which includes a first metal, is filled in the trench 72 and on a top surface of the substrate 70 in step 204. The first functional material 74 may be formed by a layered process, which involves application or accumulation of a material to a substrate or another layer using processes associated with thick film, thin film, thermal spraying, or sol-gel, among others. Alternatively, the first functional material 74 may be deposited on the substrate 70 and in the trench 72 using a braze reflow process, as previously described in connection with step 122 of FIG. 2C. For example, the first functional material 74 may be formed by placing a metallic foil on the substrate 70, followed by melting the metallic foil so that the molten material may fill in the trench 72 and reflows to a top surface of the substrate.

Next, similar to step 124 described in connection with FIG. 2C, in step 204, the first functional material 74 may be thermally treated, such as by annealing. Thereafter, excess first functional material 74 is removed from the substrate 70 to thereby leave the first functional material 74 within the at least one trench 72 of the substrate 70 to form a first functional element 76 in step 206. The removing process may be a chemical-mechanical process (CMP), etching, or polishing. Then, a dielectric layer 78 is deposited over the first functional element 76 and over the substrate 70 in step 208.

Next, at least one via 79 is formed through the dielectric layer 78 at at least two corresponding locations to expose a portion of the first functional element 76 in step 210. The via 79 may include a via hole 80 and a trench 82. This step includes a step of forming a trench 82 in the dielectric layer 78, and a step of forming a via hole 80 through the dielectric layer 78 and into the first functional element 76. The trench 82 may be formed before or after the via hole 80 is formed. The via 79 may be formed by laser cutting. The trench 82 may have a depth in the range of approximately 100 nm to 100 μm.

A second functional material 84 is deposited into the via 79 including the via hole 80 and the trench 82 and a top surface of the dielectric layer 78 so that the second functional material 84 is in contact with the first functional element material 76 in step 212.

Excess second functional material 84 is removed from the dielectric layer 78, thereby leaving the second functional material 84 within the via 79 to form electrical terminations to the first functional element 76 in step 214. In this step, the second functional material 84 remaining in the trench 80 forms a second functional element 86. The top surface of the second functional material 84 after the removing step is flush with the top surface of the dielectric layer 78. Alternatively, the second functional material 84 may be etched to form a desired profile.

When the method 200 is used to form an electric heater, the first functional element 76 may be a resistive heating element and the second functional element 86 may be a routing element for connecting the resistive heating element to an external power source. When the method 200 is used to form an electrode layer of an electrostatic chuck, the first functional element 76 may be an electrode element and the second functional element 86 may by a routing element for connecting the electrode element to an external power source.

Alternatively, the first functional element 76 may be configured to be a routing element, whereas the second functional element may be configured to be a resistive heating element, or an electrode element. In this case, the via hole 80 may be filled with the same material of the first functional element 76 or a different material for a desired electrical conduction.

Thereafter and optionally, a first post hole 90 or a second post hole 92 may be formed in step 216. The first post hole 90 extends through the dielectric layer 92 and the underlying first functional element 76. The second post hole 92 extends through the second functional element 86. The first and second post holes 90 and 92 may be formed by a laser cutting process or a bead blasting process.

Additional terminal pins (not shown) may be inserted into the first post hole 90 and/or the second post hole 92 for connecting the first functional element 76 and/or the second functional element 86 to another electrical component, such as another heater layer, a tuning layer, a temperature sensing layer, a cooling layer, an electrode layer, and/or an RF antenna layer. As a result, the additional heater layer, tuning layer, cooling layer, electrode layer, or RF antenna layer can be connected to the same routing element and to an external power source. The additional heater layer, tuning layer, cooling layer, electrode layer, RF antenna layer may be manufactured by the methods 100 or 200 described in connection with FIGS. 2A to 3.

With respect to the method 100 disclosed in connection with FIGS. 2A to 2E, while the method of the present disclosure has been described to include sub-processes of manufacturing the heater layer 12 and the routing layer 14, the method 100 may include additional one or more sub-processes of manufacturing additional one or more electrical component using similar steps. For example, the method 100 may further include a sub-process for manufacturing another heater layer, tuning layer, a cooling layer, an electrode layer, and RF antenna layer, etc.

Alternatively, the sub-process of manufacturing the heater layer 12 may be used to form another electrical component by filling a different material in the trench. For example, a cooling layer may be formed if a Peltier material fills in the trench of the substrate. An electrode layer for an electrostatic chuck may be formed if an electrode material fills in the trench. An RF antenna layer may be formed if a suitable RF antenna material fills in the trench. A thermal barrier layer may be formed if a material with relatively low thermal conductivity fills in the trench. A thermal spreader may be formed if a material with relatively high thermal conductivity fills in the trench.

The electric heater 10 manufactured by the methods 100, 200 of the present disclosure has an embedded heating circuit and an embedded routing circuit, and a plurality of functional layers that are more planar throughout the substrate. Therefore, the electric heater can have a more uniform structure and more uniform heating performance.

It should be noted that the disclosure is not limited to the embodiment described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. A method of constructing a heater comprising the steps of:
   providing a substrate, the substrate being a monolithic body;
   forming at least one trench into the substrate;
   depositing a functional material onto the substrate and into the at least one trench;
   removing excess functional material from the substrate to thereby leave the functional material within the at least one trench of the substrate to form a functional element; and
   providing an electrical termination in contact with the functional element.

2. The method according to claim 1, further comprising forming at least one via through the substrate to at least two corresponding locations on the functional element.

3. The method according to claim 2, further comprising providing the electrical termination in the at least one via to make the electrical termination in contact with the functional element.

4. The method according to claim 1, further comprising depositing a dielectric layer over the substrate.

5. The method according to claim 1, wherein the step of forming at least one trench is achieved by using a deposition and hard mask etching process comprising the steps of:
   depositing a hard mask onto the substrate;
   depositing a photo resist layer onto the hard mask;
   developing the photo resist layer on the hard mask;
   etching through the hard mask to form the pattern;
   removing the photo resist layer;
   etching through the pattern and into the substrate to form the at least one trench; and
   removing the hard mask.

6. The method according to claim 1, wherein the functional material is thermally treated after the functional material is deposited onto the substrate and into the at least one trench.

7. The method according to claim 1, wherein the step of removing excess functional material comprises a process selected from a group consisting of a chemical-mechanical planarization/polishing (CMP), etching, and polishing.

8. The method according to claim 1, wherein the at least one trench is formed by a process selected from a group consisting of a laser removal process, a bead blasting process, machining, 3D sintering/printing/additive manufacturing, green state, molding, waterjet, hybrid laser/water, and dry plasma etching.

9. The method according to claim 1, wherein the functional material is deposited onto the substrate and into the at least one trench by using a layered process.

10. The method according to claim 9, wherein the layered process is selected from the group consisting of thick film, thin film, thermal spray, and sol-gel.

11. The method according to claim 1, wherein the functional material is deposited using a braze reflow process.

12. The method according to claim 11, wherein the functional material is deposited by melting a metal foil into the at least one trench and onto the substrate.

13. The method of claim 1, further comprising forming a second trench and melting a foil into the second trench, and bonding the functional element to another substrate or electrical component by using the molten material.

14. The method according to claim 13, wherein the second trench is formed along a periphery of the substrate.

15. The method according to claim 1 further comprising forming a routing layer using the method of claim 1 and bonding the routing layer to the heater.

16. The method according to claim 1 further comprising forming a tuning layer and bonding the tuning layer to the heater.

17. The method according to claim 1 further comprising forming a via though the functional element.

18. The method according to claim 17 further comprising forming a terminal pin into the via.

19. A heater formed according to the method of claim 1.

20. The heater according to claim 19, the substrate is ceramic from group of aluminum nitride, and aluminum oxide and the resistive material is a nickel- titanium alloy formed within the at least one trench using a braze reflow process.

* * * * *